United States Patent Office 3,035,385
Patented May 22, 1962

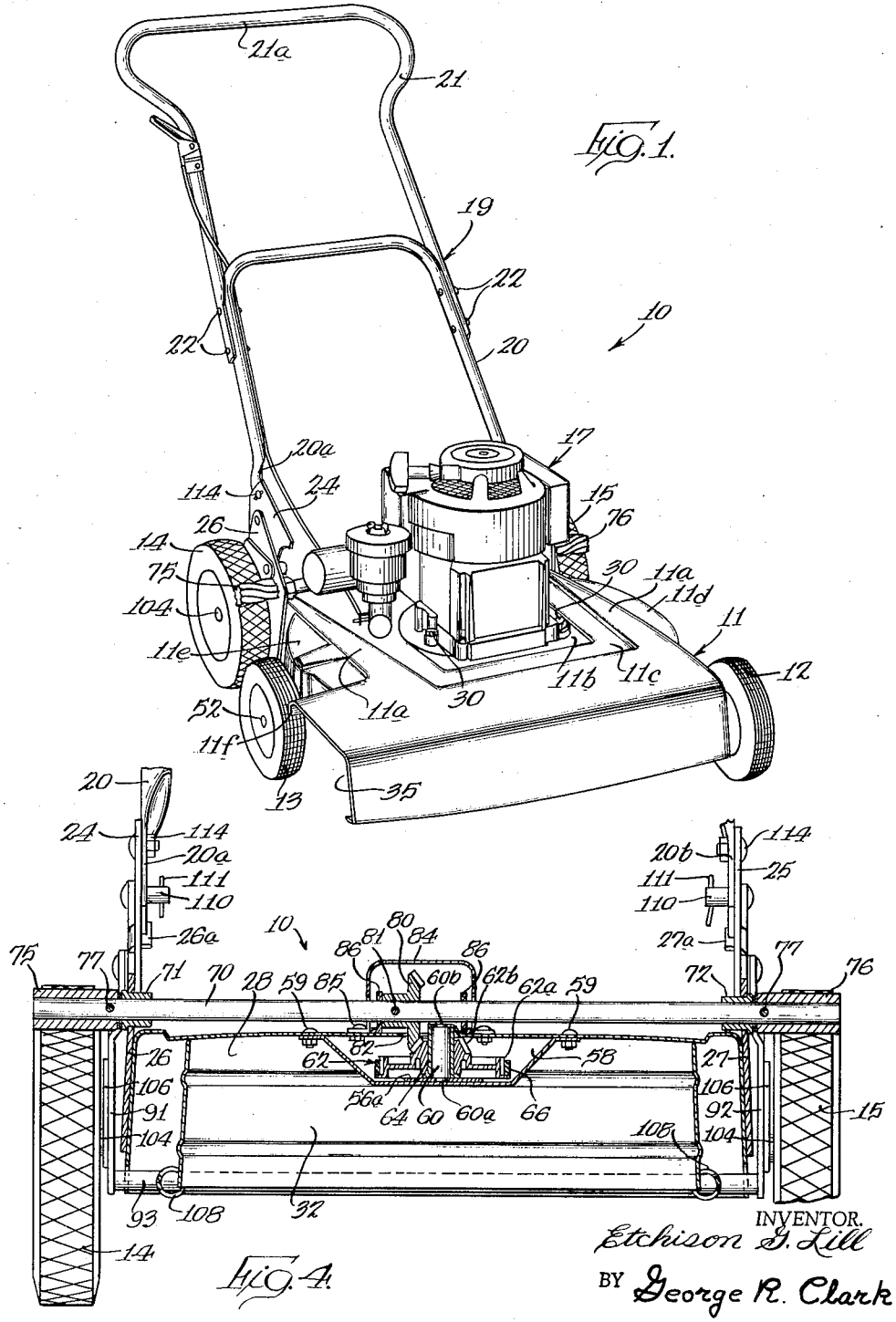

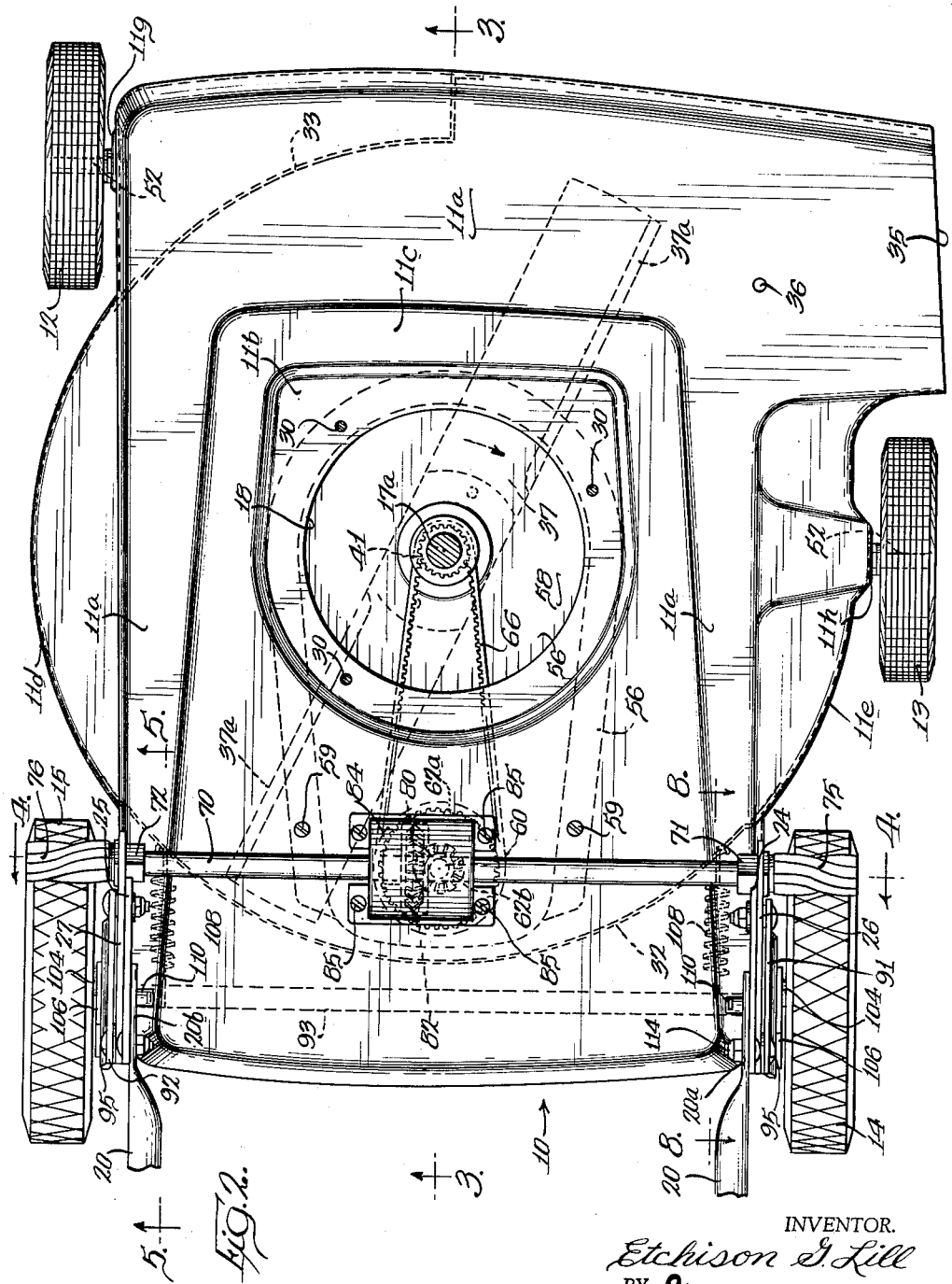

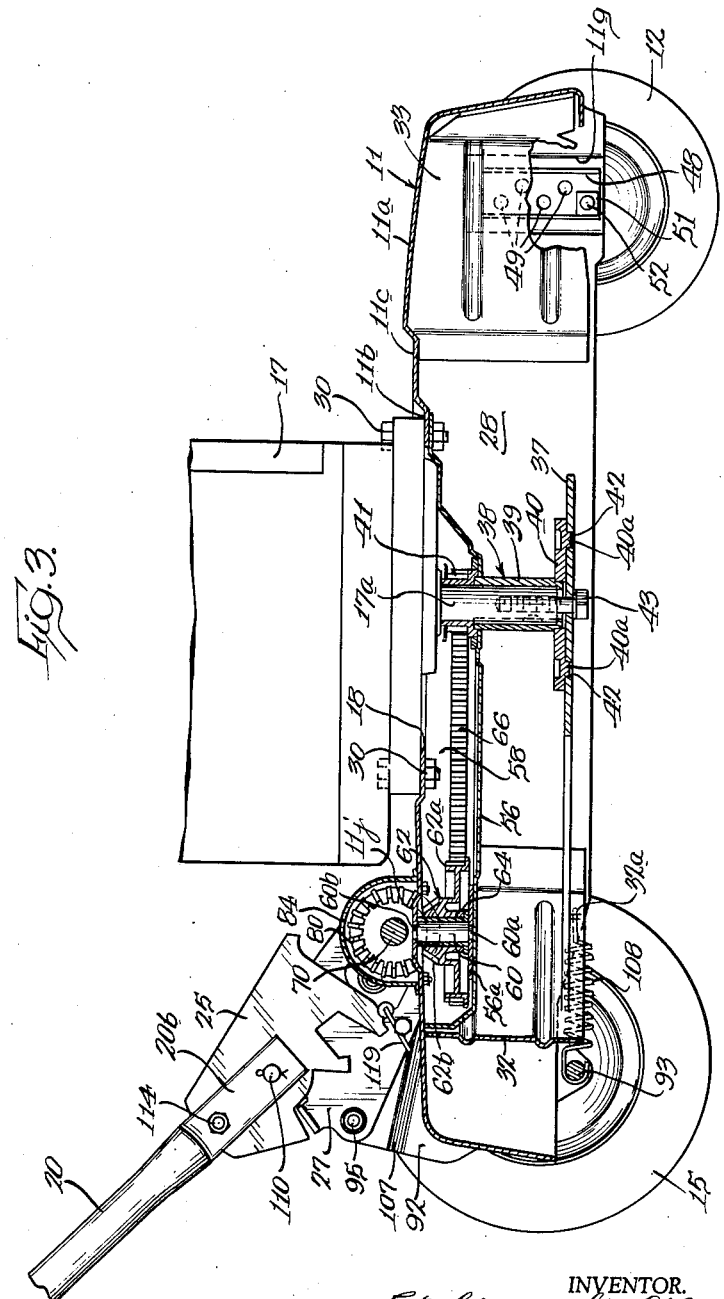

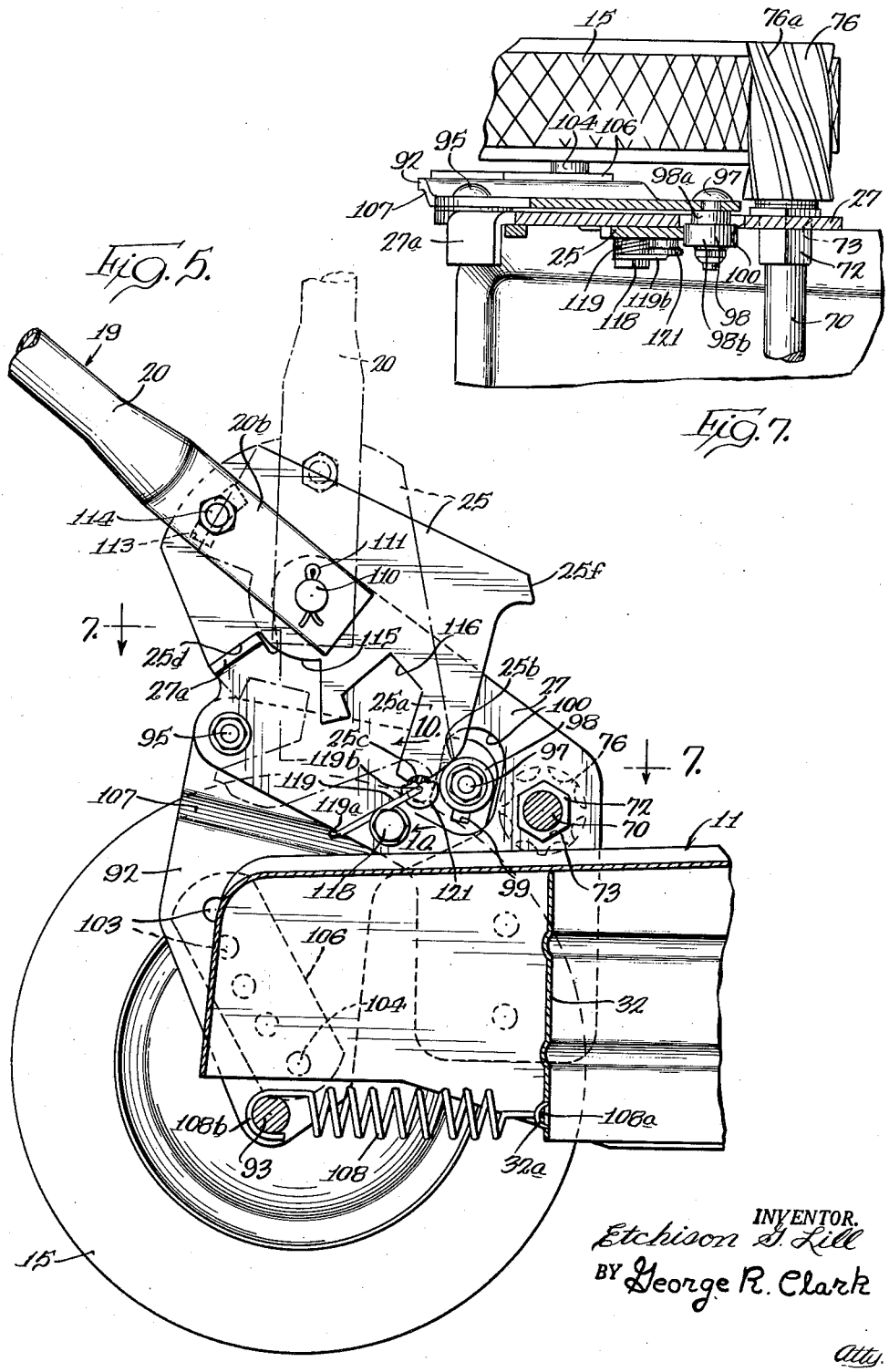

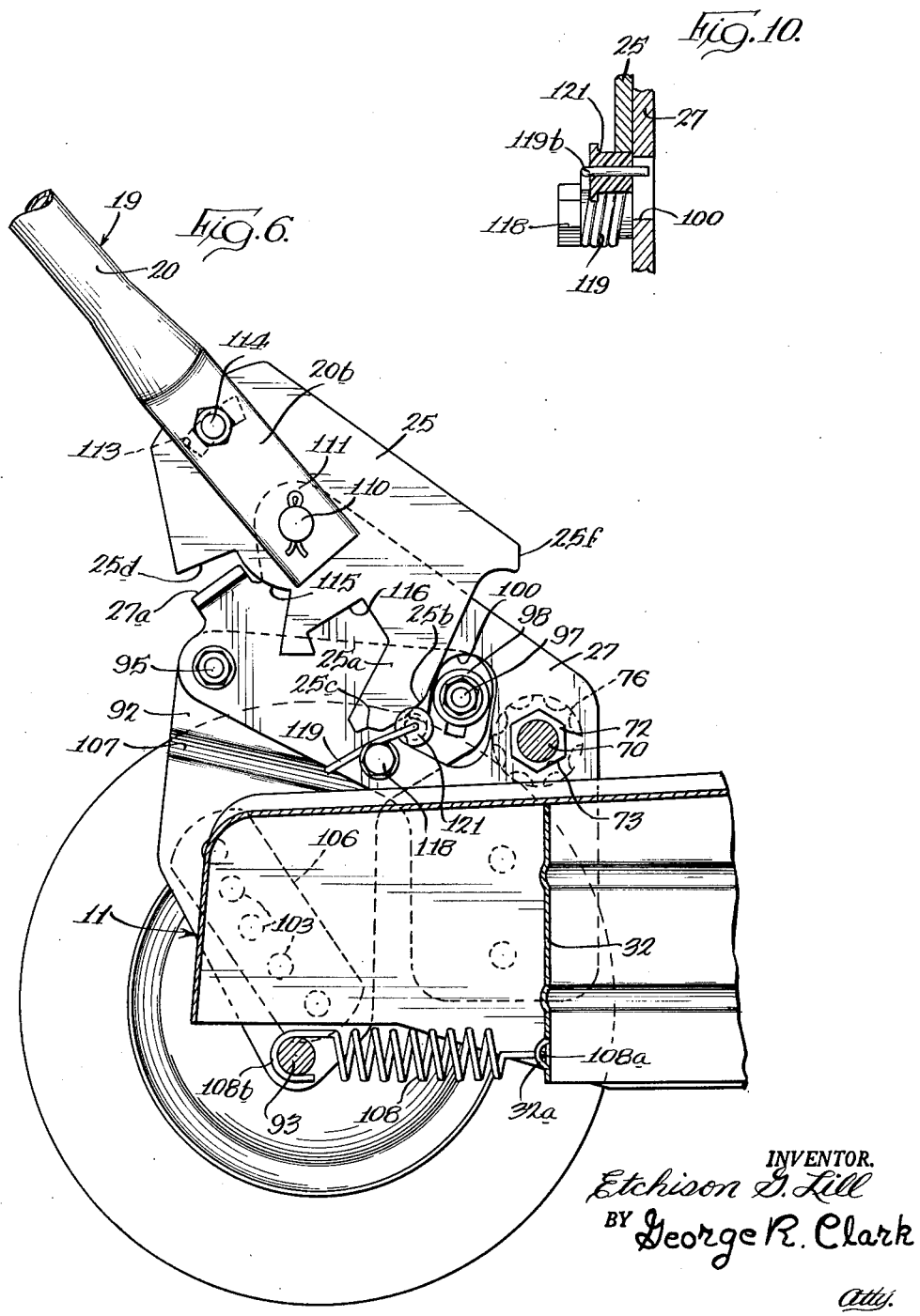

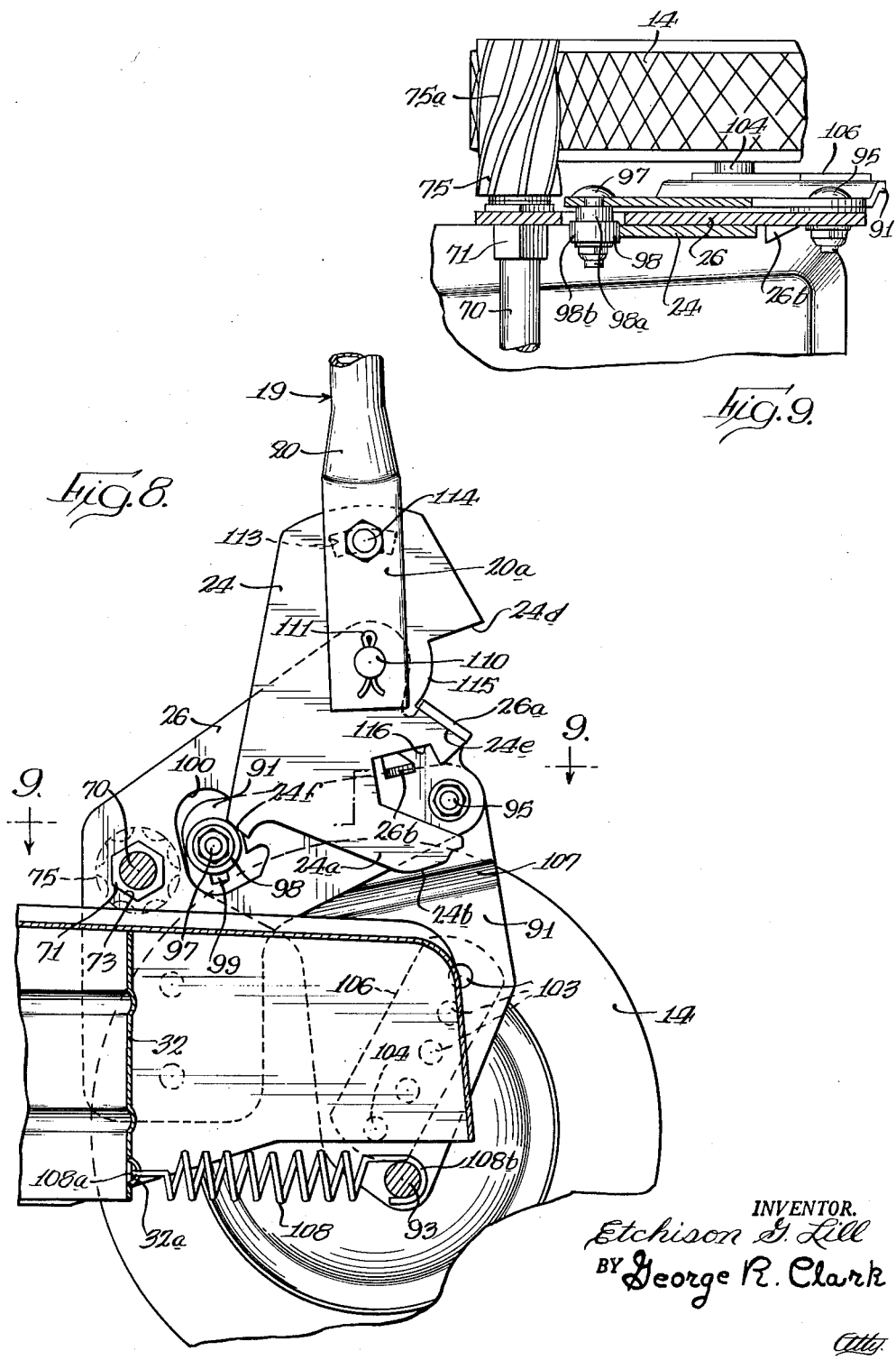

3,035,385
SELF-PROPELLED LAWN MOWER
Etchison G. Lill, East Lansing, Mich., assignor to Sunbeam Corporation, Chicago, Ill., a corporation of Illinois
Filed Aug. 24, 1959, Ser. No. 835,464
8 Claims. (Cl. 56—25.4)

The present invention relates to self-propelled lawn mowers and, more particularly, to a self-propelled rotary lawn mower. Specifically, the present invention is in some respects an improvement on copending Lill application Serial No. 720,485, filed March 10, 1958, and assigned to the same assignee as the instant application.

The power lawn mower which was a novelty only a relatively few years ago, being used primarily in connection with large estates and the like, has come into such extensive use that there is hardly a home owner, regardless of the size of his lawn, who does not have access to the use of a power lawn mower. Power operated lawn mowers are of many different types. Some are of the reel type, some of the so-called rotary type, some powered by electric motors, and others by self-contained internal combustion engines. Many lawn mowers have been manufactured with the prime mover merely supplying power to the cutting means while the propulsion of the mower over the area to be cut is left to the operator of the lawn mower. In other cases, the prime mover not only drives the cutting means but also supplies the necessary power to propel the same over the area to be mowed. The present invention is primarily concerned with a lawn mower of the type wherein the prime mover drives or propels the carriage over the area being mowed, but wherein such propulsion means may be rendered ineffective so that the lawn mower may be operated in a sort of free wheeling manner for mowing around trees, flower beds and other hard to get at spots.

In a copending Jepson application Serial No. 488,318, filed February 15, 1955, now Patent No. 2,962,854, and assigned to the same assignee as the instant application there is disclosed and claimed a power lawn mower in which the principle of free wheeling is employed in that by mere manipulation of the handle of the mower the power is applied or not applied to drive the mower over the area to be cut. This feature has been found to be unusually desirable and the present invention is concerned with an improvement thereon. This improvement, however, has been specifically illustrated as being applied to a lawn mower of the construction shown and claimed in the above mentioned copending Lill application.

In a power lawn mower where the transmission of motive power from the prime mover to ground wheels to propel the same over an area to be mowed is controlled by the handle by which the mower is guided, one must readily be able to move the mechanism from the "drive" to a "no-drive" position by slight movement of the handle. At the same time, it will be appreciated that such a lawn mower must be capable of being moved over various obstructions in a simple manner. For example, at times it may be desirable to bear down on the handle to raise the forward portion of the lawn mower so it will clear an obstruction and at other times it is desirable to lift upwardly on the handle to raise the rear portion of the lawn mower to go over a similar obstruction. Also, for storage purposes it is essential that the mower be stored in as small a space as possible and such handle must therefore be capable of being moved to a position where it is disposed directly over the mower proper. Consequently, there must be provided a handle mechanism which will control the "drive" and "no-drive" operation but which will also incorporate the other desirable features enumerated above.

Accordingly, it is an object of the present invention to provide an improved power lawn mower having an improved handle control incorporating the desired features enumerated above.

It is another object of the present invention to provide an improved self-propelled lawn mower.

It is another object of the present invention to provide an improved self-propelled rotary type lawn mower which is simple and compact in construction, light in weight, lends itself readily to mass production and which is capable of giving long years of satisfactory service.

Still another object of the present invention is to provide an improved power drive for a lawn mower which is rendered effective or ineffective through manipulation of the handle for guiding the mower and yet wherein the handle is available to manipulate the mower just as if the power drive were not incorporated.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

FIG. 1 is a perspective view of a power lawn mower embodying the present invention with the handle moved to the "no-drive" position;

FIG. 2 is a top plan view of the lawn mower of FIG. 1, to a larger scale, with substantially all of the prime mover and certain portions of the handle mechanism cut away;

FIG. 3 is a sectional view taken on line 3—3 of FIG. 2 but showing a portion of the prime mover in position;

FIG. 4 is a sectional view taken on line 4—4 of FIG. 2;

FIG. 5 is an enlarged sectional view taken on line 5—5 of FIG. 2 showing the handle and associated mechanism in the "no-drive" position, and showing in dashed lines a portion of the handle mechanism in the storage position;

FIG. 6 is a view identical with FIG. 5 showing the handle and associated mechanism in the "drive" position;

FIG. 7 is a sectional view taken on line 7—7 of FIG. 5;

FIG. 8 is a view taken on line 8—8 of FIG. 2 but showing the handle in the storage position;

FIG. 9 is a sectional view similar to FIG. 7 but taken on line 9—9 of FIG. 8; and FIG. 10 is a fragmentary sectional view taken on line 10—10 of FIG. 5.

Briefly, the present invention is concerned with a power lawn mower having the conventional internal combustion engine driving suitable grass cutting means. The carriage of the mower is supported on four wheels which are arranged in staggered fashion to guard against scalping of the lawn. The two rear wheels instead of being mounted directly to the carriage are supported on plates which are pivotally connected to the carriage so that the wheels may be moved toward and away from a driving member suitably supported on the carriage thereby to propel the mower over the area to be cut. The handle mechanism is pivotally supported from the carriage and through suitable mechanism controls the movement of the rear wheels toward and away from the driving means. Additionally, means are provided whereby the handle can be used to manipulate the carriage over the conventional obstruction and additionally so that the handle may, for storage purposes, be disposed in a substantially vertical position.

Referring now to the drawings, there is shown therein a rotary mower generally indicated at 10 which includes a suitable support or carriage 11 mounted on ground wheels 12, 13, 14 and 15. A suitable prime mover generally indicated at 17 is mounted on the carriage or platform 11, the prime mover being specifically shown in FIG. 1 as an internal combustion engine but obviously may comprise any other suitable form of prime mover such as an electric motor or the like. As illustrated, the prime mover is provided with a vertically disposed output or drive shaft 17a which extends through a suitable opening 18 provided in support 11. The mower 10 is manipulated by the user through a suitable handle generally designated at 19 (FIG. 1) which essentially comprises a lower handle 20 and an upper handle 21 secured together, as indicated in the drawings, by suitable fastening means 22. The upper handle 21 comprises a U-shaped tubular member, the bight portion 21a of which provides a suitable hand grip for the operator. The ends of the upper handle remote from the bight are deformed to define concave surfaces for receiving in close fitting engagement portions of the lower handle as clearly indicated in FIG. 1 of the drawings. The lower handle 20 is effectively a U-shaped tubular member with the ends of the U flattened as indicated at 20a and 20b to define a surface for securing the same to suitable handle brackets or plates 24 and 25, respectively. The handle brackets 24 and 25 are pivotally supported to suitable somewhat L-shaped side or bearing plates 26 and 27 each having one arm of the L suitably secured by welding or otherwise to the carriage or support 11.

The support or carriage 11 may be substantially identical with the support or carriage disclosed in the copending Lill application referred to above. Preferably it is essentially an inverted pan-shaped housing open at the bottom to define a grass cutting chamber 28 therein, as is best shown in FIGS. 3 and 4 of the drawings. As illustrated, the support or housing 11 is formed of a sheet metal stamping which has numerous advantages over a casting. In the first place, it can be made light in weight even though formed of a relatively heavy high strength metal. Furthermore, the grass cutting chamber 28 will be defined by a very smooth surface so that grass particles will not stick thereto as often happens where the housing comprises a casting since such castings usually comprise a rough surface.

For the purpose of providing the necessary rigidity, the support or housing 11 is provided on its top surface or deck which supports the prime mover 17 with an upwardly directed U-shaped stiffening rib 11a with the bight of the U extending across the front of the mower. Moreover, the deck includes a somewhat central shallow depressed section 11b directly engaging and supporting the bottom of the prime mover 17, as best shown in FIGS. 1 and 3 of the drawings. This central section 11b includes the opening 18 referred to above which is a relatively large opening through which the drive shaft 17a extends. The opening 18 and the section 11b are surrounded by an area 11c just inside the U-shaped raised rib 11a which area is below the level of the rib 11a but above the level of area 11b. This arrangement imparts the desired rigidity to the support 11 and keeps the mounting of the engine low with respect to the ground. The prime mover 17 is flanged at the bottom to receive suitable bolts 30 for securing the same to the support 11 in a conventional manner.

It will be apparent that the housing or support 11 may have any suitable shape but it has been illustrated as of a generally rectangular construction. This arrangement gives an attractive appearance and also permits the wheels 12, 13, 14 and 15 to be spaced sufficiently far apart to provide stability for the mower by avoiding top heaviness of the housing 11 and associated prime mover 17 mounted thereon. However, to provide the most efficient cutting action of a cylindrical cutter chamber is effectively defined within the housing 11. This is accomplished by providing, at each side of the housing 11, arcuate wall portions 11d and 11e, as clearly shown in FIGS. 1 and 2 of the drawings. In addition, an arcuate rear baffle plate 32 (FIGS. 2, 3, 4, 5 and 6) and an arcuate corner baffle plate 33 (FIGS. 2 and 3) are positioned within the housing 11 and tend to complete the cylindrically shaped mower chamber which is defined in part by the arcuate wall portions 11d and 11e. The rear baffle plate 32 is welded at its ends to the rear end of the arcuate wall portions 11d and 11e and thus forms a circular continuation of these portions, as clearly shown in FIG. 2 of the drawings. The corner baffle plate 33 has one end thereof secured as by welding so as to form a continuation of the wall portion 11d and the other end is suitably secured as by welding to the center front of the housing 11. The space between the end of the corner baffle 33 and the adjacent end of the arcuate wall portion 11e is open and defines a discharge chute 35 through which cut grass may be discharged from the grass cutting chamber 28 of the housing or support 11.

As is fully disclosed in the copending Lill application, when the mower 10 is to be used for mulching leaves and the like a suitable arcuate perforated mulching plate, not shown, is secured into position between the adjacent ends of the corner baffle 33 and the arcuate wall portion 11e so as to provide a complete cylindrical surface opening into the discharge chute only through the perforations in the mulching plate, not shown. For the purpose of securing the mulching plate into position, the support 11 is provided with a suitable opening 36 (FIG. 2) through which a suitable bolt or the like secured to the perforated mulching plate may extend.

The present invention is not concerned with the particular grass cutting means employed. To show an operative structure, however, there is provided in the grass cutting chamber 28, defined by the housing 11, a cutting blade 37 which is directly connected to the lower end of drive or output shaft 17a of the prime mover 17 so as to be driven thereby. To secure the blade 37 to the shaft 17a there is provided a blade adapter assembly 38 which comprises the hub portion 39 secured at its lower end to a drive plate 40 and at its upper end secured to a pulley 41. The hub portion 39 is a tubular member which has an inside diameter slightly larger than the output or drive shaft 17a of the prime mover 17 to which the blade adapter assembly 38 is suitably keyed. The drive plate 40 is suitably welded or otherwise secured to the lower end of the hub portion 39 and has a pair of integral projections 40a which are adapted to be received in suitable openings 42 defined in the cutting blade 37. A suitable bolt 43 then secures the blade 37 to the drive shaft 17a with one face of the blade engaging the drive plate 40 and with the projections 40a disposed in the openings 42. With this arrangement, driving engagement with the blade 37 is obtained at a point spaced substantially from the axis of the drive shaft 17a. In addition, the drive plate 40 provides stability and rigidity for the blade 37 against movement or deflection in a direction perpendicular to its plane of rotation. With this arrangement, moreover, a light blade may be used while still retaining sufficient rigidity in the blade. The blade is rotated in a clockwise direction, as viewed in FIG. 2 of the drawings, with cutting edges 37a as indicated provided on the leading edges thereof. With this direction of rotation the clippings are readily thrown out of the discharge chute 35. If desired the blade 37 may be provided with upturned vanes at the ends thereof on the trailing edges to create an updraft of the air to lift the grass as the mower is moved over it and also to act as a centrifugal fan to blow air and clippings through the discharge chute 35. The cylindrical chamber described above comprising the wall portions 11d and 11e, the rear baffle plate 32 and the corner baffle plate 33 provide a cylindrical housing of a diameter slightly larger than the length of the blade 37. With this arrangement, a very efficient mowing discharging action is effected by providing a close fitting mower chamber for the blade 37, which chamber is cylindrical except for the discharge opening defined by the chute 35.

So as not to interfere with the discharge of grass clippings from the housing 11, the rear portion of the discharge chute 35 is open except for a very short downwardly turned flange 11f, clearly shown in FIG. 1 of the drawings. This flange 11f adds the necessary rigidity to the chute but is sufficiently short so as to prevent the piling up of wet clippings or clogging the chute 35 by clippings collected between the flange 11f and the wall 11e. To prevent objects such as stones or the like thrown out of the chute 35 from moving rearwardly toward the operator the wheel 13 is positioned just to the rear of the chute 35 and hence is in the path of any objects and clippings thrown out of the housing 11 by the cutting blade 37. It thus acts as a suitable guard.

As in the above mentioned copending Lill application, the front wheels 12 and 13, which are arranged in staggered relationship as described above to prevent scalping of the lawn, are mounted directly to the housing 11. In order to provide rigidity to the portions of the housing 11 mounting these wheels channel portions 11g and 11h (FIGS. 1 and 3) are formed or stamped in the side walls of the housing 11 for the wheels 12 and 13, respectively, and in these channel portions reinforcing channels such as 48, FIG. 3 of the drawings, are welded. These channel portions 11g and 11h and the associated channels such as 48 are provided with aligned openings 49 staggered relative to one another. These openings are spaced from the sides of the channels 48 sufficient distances to permit nuts 51 to enter the channel 48 but are spaced close enough to the sides of the channel 48 so that turning of the nuts 51 is prevented when bolts 52 defining wheel axles for the wheels 12 and 13 extend through the selected ones of the openings 49 and threadedly engage the nuts 51. These bolts 52 serves to mount the wheels 13 and 14 in a manner well known in the art. By the provision of the several holes 49 for selectively mounting the bolts 51 adjustment of the height of the mower may be effected. As illustrated in FIG. 3 of the drawings, the particular adjustment shown is for the maximum height of cut.

Since the drive shaft of the prime mover 17 is directly connected to the cutting means comprising the cutting blade 37, obviously whenever the prime mover is operated the cutting means will also be operated. In order that the prime mover 17 may also be used to drive propulsion means for propelling the mower 10 over the area being mowed there is drivingly connected to the drive shaft 17a as already described the pulley 41. In order to define as suitable drive mechanism chamber for the means for transmitting power from the pulley 41 to other means for propelling the mower 10 over the area to be mowed, there is provided a shield or housing member 56 which is of pan-like configuration secured to the underside of the support 11 within the grass cutting chamber 28. With this arrangement there is defined a mechanism chamber 58 within which is disposed the pulley 41. The shield 56 is held in position at its forward end by the bolts 30 which hold the prime mover 17 on the support 11. Additional fastening means 59 (FIGS. 2 and 4) secure the rear end of the shield or cover 56 in place so as to define an effectively sealed mechanism chamber 58 whereby the driving mechanism described hereinafter will not be subjected to grass cuttings, dust, leaf mulchings and the like.

In accordance with the present invention there is provided a vertically disposed stub shaft 60 which has a projection 60a of reduced cross section extending into an opening in a plate 56a suitably secured to the inside shield 56. The upper end of the stub shaft 60 is also provided with a portion of reduced cross section 60b which extends into an opening in a raised portion 11j (FIG. 3) of the support or housing 11. A suitable combined pulley and gear, generally designated at 62, is rotatably mounted on the stub shaft 60. As illustrated, the combined pulley and gear assembly 62 preferably includes an integral casting comprising a pulley portion 62a and a bevelled gear portion 62b, best shown in FIGS. 2, 3 and 4 of the drawings. A suitable bearing 64 rotatably supports the combined pulley and gear member 62 on the stub shaft 60. In order drivingly to connect the pulleys 41 and 62a, a suitable belt 66 is provided. As best shown in FIG. 2 of the drawings, the pulleys 41 and 62a are preferably toothed pulleys and the belt 66 has cooperating projections thereon, thereby eliminating any slippage problem. It will be apparent that rotation of the drive shaft 17a will cause rotation of the bevelled gear 62b and depending upon the pulley ratio any suitable desired speed of rotation of bevelled gear 62b may be obtained.

Preferably, and as disclosed in the above mentioned copending Jepson application Serial No. 488,318, there is provided a horizontally disposed jack shaft 70 supported for rotation about an axis fixed with respect to the carriage or support 11. As illustrated, this jack shaft 70 extends through aligned openings defined in the side plates 26 and 27 and suitable bearings 71 and 72 are provided supported within these aligned openings in the side plates 26 and 27, respectively. So that these bearings 71 and 72 may be fixed in these aligned openings the bearings are preferably formed with an exterior hexagonal configuration so as to cooperate with hexagonal aligned openings 73 defined in the plates 26 and 27. In FIGS. 5 and 8 of the drawings, the hexagonal openings 73 are shown as receiving the hexagonal-shaped exteriors of the bearings 71 and 72.

It should be pointed out that the side plates 26 and 27, which as was mentioned above are of somewhat L-shaped configuration, have one arm of the L spot welded to the depending flange at the sides of the housing 11 adjacent the rear thereof, the other arms of the L-shaped supports 26 and 27 then extend upwardly and rearwardly, as is clearly shown in FIGS. 5, 6 and 8 of the drawings. The aligned hexagonal openings 73 in the side plates 26 and 27 are toward the front of these plates and disposed forwardly of the axis of rotation of wheels 14 and 15 and below the top. Secured to each end of the jack shaft 70 and specifically to the portions thereof projecting beyond the side plates 26 and 27 are drive members or drive rollers 75 and 76 which are pinned as indicated at 77 in FIG. 4 of the drawings to the jack shaft 70. The drive rollers 75 and 76 may be knurled or preferably fluted such as by spiral flutes 75a and 76a, as clearly shown in FIGS. 7 and 9 of the drawings, so as to be capable of making frictional driving engagement with the periphery of the wheels 14 and 15 which in turn are preferably provided with suitable rubber tires or the like.

It is, of course, desired to rotate the horizontal jack shaft 70 at a predetermined speed in response to rotation of the drive or output shaft 17a of the prime mover 17. To this end, there is provided a jack shaft gear 80 which is suitably pinned as is indicated at 81 to the jack shaft 70 directly above an opening 82 (FIGS. 2 and 4) defined in the housing 11, whereby the jack shaft gear 80 which is a bevelled gear may be drivingly engaged by the gear portion 62b of the combined pulley and gear assembly 62. It will be appreciated that the bevelled gear 62b and the portion of the jack shaft gear 80 disposed within the mechanism chamber 58 is properly housed so the operator cannot come in contact therewith. However, in order to prevent the operator with coming in contact with the portion of the jack shaft gear 80 disposed above the housing 11 a suitable gear cover 84 is provided which is suitably secured as by fastening means 85 to the support or housing 11. To close the ends of this housing where the shaft 70 passes therethrough, shield members 86 are provided. These members 86 are somewhat L-shaped members having one leg of the L resting on the housing 11 and the other arm of the L having suitable openings through which the shaft 70 may extend.

It will be appreciated that with the axis of the jack shaft 70 mounted in fixed relationship with respect to the carriage or support 11, in order for the ground wheels 14 and 15 selectively to make driving engagement with the drive rollers 75 and 76, the wheels 14 and 15 must be capable of movement into and out of driving engagement with the associated drive rollers 75 and 76, respectively. To this end there is provided a wheel bracket assembly which to insure simultaneous movement of both wheels 14 and 15 is preferably a unitary structure comprising a pair of wheel brackets or wheel mounting plates 91 and 92 which are interconnected by a suitable tie rod 93. As illustrated, the wheel brackets 91 and 92 are each of somewhat triangular configuration with the tie rod 93 interconnecting these brackets at one of the apices of the triangle. These wheel brackets 91 and 92 are pivotally mounted from the side plates 26 and 27, repsectively, at another of the apices of the triangle by suitable pivot bolts 95 which extend through aligned openings in the wheel bracket 91 and side plate 26 and the wheel bracket 92 and side plate 27, respectively. Secured to each of the wheel brackets 91 and 92 at a third of the apices of the triangle by means of suitable bolts 97 are rollers or abutments 98 which also serve as roller cams as described in detail hereinafter. As best shown in FIGS. 5, 7 and 9, the bolts 97 extend through elongated or slotted openings 99 in the wheel brackets 91 and 92 and support thereon suitable roller means 98 which include a portion of reduced cross section 98a and an enlarged roller portion 98b, the former portion extending through an enlarged opening 100 defined in the associated side plates 26 and 27, respectively. The enlarged portion 98b of each of the rollers 98 is a cam roller for the purpose of selectively controlling the position of the wheel bracket assembly in a manner which will be described in more detail hereinafter. It will be apparent, therefore, that the openings 100 in the side plates 26 and 27 permit the necessary pivotal movement of the wheel brackets 91 and 92. The two positions of the wheel brackets are clearly shown in FIGS. 5 and 6 of the drawings, the former showing the "no-drive" position and the latter the "drive" position. The elongated openings 99 in the wheel brackets 91 and 92 permit adjustment of the cam rollers 98b so as to adjust the "drive" position in a manner also discussed in greater detail hereinafter.

It will be appreciated that the wheel brackets 91 and 92 are essentially supports for the wheels 14 and 15 and to this end these brackets are provided with a plurality of spaced tapped openings 103, which are arranged on the arc of a circle, to receive suitable bolts 104 which bolts define the axles for the wheels 14 and 15. The bolt 104 is shown in FIG. 5 in the lowermost of the holes 103 which indicates that the lawn mower is adjusted for the maximum height of cut. Preferably, to provide sufficient thickness in the wheel brackets 91 and 92 to accommodate the tapped openings 103 without making these plates too heavy, reinforcing plates 106 are suitably welded to each of the wheel brackets 91 and 92 and each reinforcing plate 106 has openings alinged with the openings 103 which are similarly tapped to receive the bolts 104 defining the axles for the wheels 14 and 15. It will be appreciated that the openings 103 are arranged on the arc of a circle with respect to the fixed axis of the jack shaft 70 so that regardless of the particular height of cut the same driving engagement between the periphery of the wheels 14 and 15 and the associated drive rollers 75 and 76 will be insured. In the particular device disclosed in the drawings, the wheel brackets 91 and 92 have the upper and lower portions thereof disposed in slightly different planes with the junction between the planes indicated at 107. It will be appreciated that this offset in the wheel brackets is merely to provide a more compact structure and the plates might be flat pieces if desired.

For the purpose of insuring positive driving engagement between the peripheries of the wheels 14 and 15 and the associated drive rollers 75 and 76 there are provided a pair of tension springs 108 which, as is best shown in FIGS. 2, 4, 5 and 6 of the drawings, have the forward ends thereof designated at 108a secured to suitable projections 32a defined on the rear of arcuate baffle plate 32 while the other ends 108b are hooked around the tie rod 93. Thus, as viewed in FIGS. 5 and 6 of the drawings, the springs 108, one being disposed on either side of the housing 11 as best shown in FIGS. 2 and 4 of the drawings, bias the wheel brackets 91 and 92 in a counterclockwise direction about the pivotal axis of the bolts 95 urging these brackets from the position shown in FIG. 5 of the drawings where the drive rollers 75 and 76 are not in driving engagement with the wheels 14 and 15 to the position shown in FIG. 6 which is the "drive" position. It will be appreciated that the engagement of the wheels 14 and 15 with the friction drive means or rollers 75 and 76 limits the maximum counterclockwise pivotal movement of the brackets 91 and 92, as viewed in FIG. 5 of the drawings. The openings 100 must be sufficiently large not to interfere with this movement. By virtue of the slots 99 in the wheel brackets 91 and 92 the position of the rollers 98 may be adjusted to permit the desired traction while the parts are in the "drive" position and at the same time to see that in the "no-drive" position the drive rollers 75 and 76 are free of the wheels 14 and 15. Thus, as wear of the rubber tires associated with the wheels 14 and 15 occurs, the position of the rollers 98 may be adjusted to insure proper operation regardless of wear.

In order that the wheel bracket assembly may be pivotally operated between the two positions shown in FIGS. 5 and 6 of the drawings by manipulating the handle assembly 19 a more detailed consideration of the handle brackets 24 and 25 and their association with both the side plates 26 and 27 and the lower handle 20 is warranted. Actually, the side plates 26 and 27 with or without the handle assembly 19 might be termed ground wheel drive control means. Unlike the wheel brackets 91 and 92 and the side plates 26 and 27 which are right hand and left hand members, respectively, the handle brackets 24 and 25 are identical. Consequently, only one of these brackets need be described in detail and this description will apply equally to the other bracket.

For the purpose of pivotally supporting each of the handle brackets 24 and 25 to the carriage of the lawn mower 10 each of the side plates 26 and 27 is provided with a handle pivot pin designated at 110. Preferably these pins are riveted or welded to the side plates 26 and 27 and extend towards each other from adjacent faces of the side plates 26 and 27. Each of the handle brackets 24 and 25 is provided with an opening to receive the pins 110 so as to be pivotally mounted about the axis of these pins and suitable cotter keys such as 111 then maintain the side plates in association with the pins 110. As illustrated, the handle assembly 19 is also pivoted about the axes of the pivot pins 110 and to this end the portions 20a and 20b of the lower handles 20 are provided with openings for the pivot pins 110. The portions 20a and 20b of the lower handle 20 are associated with the pins 110 after the handle brackets 24 and 25 are in place and the inherent resilience of the U-shaped member tending to bias the arms of the lower handle 20 apart hold the plates 24 and 25 in the position clearly shown in FIG. 4 of the drawings.

In order that the handle assembly 19 may be secured to the brackets 24 and 25 so that movement of the handle about the pivotal axis defined by the pins 110 causes simultaneous movement of the brackets 24 and 25, each of these brackets is provided with an arcuate slot designated at 113 for receiving a suitable bolt 114 whereby the handle assembly 19 may be clamped to the brackets 24 and 25 so as to provide an integral unit. The reason for the arcuate slots 113 in each of the brackets 24 and 25 is to provide the desired adjustment for the height of the bight portion 21a of the upper handle 21 with respect to the ground depending upon whether a short or a tall person is to operate the mower.

It will be appreciated that the "drive" condition of the handle 19 may be the upper position and the "no-drive" condition the lower position, or vice versa. However, in accordance with the illustrated embodiment the "drive" condition, shown best in FIG. 6, comprises the upper position of the handle assembly 19 and the "no-drive" condition, shown best in FIG. 5, comprises the lower position thereof. Thus, a safety feature is provided so that a small downward pressure on the handle will move the mechanism to the "no-drive" position. In order to accomplish this each of the handle brackets 24 and 25 is provided with two spaced notches 115 and 116 at the bottom thereof. Notch 116 is defined in part by a forward projection 24a in the case of bracket 24 and 25a in the case of bracket 25. At the forward portion of each projection 24a and 25a there is a cam surface 24b in the case of bracket 24 and 25b in the case of bracket 25 for engaging the enlarged portions 98b of the cam rollers 98. Thus, with reference to FIG. 5 of the drawings, when the handle assembly 19 is pivoted in a clockwise direction about the pivot pins 110 from the "no-drive" condition there shown to the "drive" condition shown in FIG. 6 the cam surfaces 24b and 25b release the roller portions 98b with the resultant counterclockwise pivotal movement of the bracket assembly, comprising brackets 91 and 92, about the axis of the bolts 95. Thus, the wheels 14 and 15 are permitted to move into driving engagement with the drive rollers 75 and 76 by the springs 108.

For the purpose of providing a readily releasable latch which will hold the handle assembly 19 in the "no-drive" position of FIG. 5, there is secured to only one of the side plates 26 or 27, specifically illustrated as side plate 27, a bolt or pin 118 supporting a torsion spring 119, see FIGS. 5 and 10, which torsion spring has a lateral projection 119a which engages the underside of one arm of the L-shaped bracket plate 27. The other end of the torsion spring 119 comprises a lateral extension 119b rotatably supporting thereon a button 121 which is disposed in the path of the cam surface 25b of the handle bracket 25. This button may be formed of sintered metal, nylon or other suitable material. Also a button may, if desired, be provided for both side plates 26 and 27. Actually the projection 25a of the bracket 25 includes a latching recess or notch 25c and in the "no-drive" position, as clearly shown in FIG. 5 of the drawings, the roller or button 121 is received within the latching notch 25c thus inherently latching the handle assembly in the "no-drive" position. So that the lateral projection 119b of the torsion spring 119 does not interfere with the operation of the handle it preferably projects into the enlarged opening 100 in the side plate 27.

For the purpose of moving the mower 10 over obstructions and for turning the mower around, it is desirable to be able to raise the front of the mower by pressing down on the handle assembly 19 thereby to pivot the mower about the axes of the wheels 14 and 15. To this end each of the side plates 26 and 27 is provided with a lateral projection designated as 26a in the case of side plate 26 and 27a in the case of side plate 27. Cooperating with the lateral projections 26a and 27a of the side plates 26 and 27 are shoulders 24d and 25d defined by virtue of the notches 115 in brackets 24 and 25 referred to above and clearly shown in FIGS. 5, 6 and 8 of the drawings. When the handle is moved to the "no-drive" position the shoulders 24d and 25d engage the corresponding lateral flanges 26a and 27a and further downward movement of the handle assembly 19 will cause the handle and the carriage to move as a unit so as to pivot the carriage about the common axis of the wheels 14 and 15 whereby the front of the mower can readily be raised.

The projections 26a and 27a, as clearly shown in FIG. 5, thus determine the "no-drive" position.

It is also desirable to be able to lift up on the handle assembly 19 and raise the rear portion of the mower to get it over certain obstructions and to this end the side plate 26 only is provided with an integral lug 26b which projects into the path of the associated bracket 24. This lug 26b is only shown in FIGS. 8 and 9, and there the handle assembly 19 is shown in a different position than would be the case to raise the rear portion of the mower over obstructions. It will readily be understood, however, that this lug 26b engages with a shoulder 24e defined at the opposite end of the notch 115 which is cut out of the bracket 24 to define the opposed shoulders 24d and 24e. The shoulder 24e upon lifting up on the handle 19 engages the projection 26b so that the rear end of the mower may be lifted.

For storage purposes it is desirable that the handle assembly 19 may be pivoted about the pivotal axis of pivot pins 110 so as to be disposed above the carriage 11. It will be appreciated that such movement of the handle 19 will be opposed by the lug 26b just described. However, the pivot pin 110 associated with the handle bracket 24 is sufficiently long so that the bracket 24 may be moved inwardly away from the side plate 26 sufficiently so that the shoulder 24e clears the lug 26b, the handle may then be pivoted in a clockwise direction from the position shown in FIG. 5 of the drawings to the position shown in FIG. 8 of the drawings. So that this position of the brackets 24 and 25 will not interfere with the bolts 95 or the lug 26b, the brackets 24 and 25 are each provided with the notch 116 referred to above. It will be appreciated that when the handle is raised toward the storage position that the springs 108 move the wheels 14 and 15 to the "drive" position. It is, however, undesirable to have the mower stored with the drive rollers 75 and 76 in the "drive" position and to this end each of the brackets 24 and 25 is provided with a cam surface 24f in the case of bracket 24 and 25f in the case of bracket 25 which, in the positions shown in solid lines in FIG. 8 and in dashed lines in FIG. 5 of the drawings, engage the rollers 98 thereby to pivot the wheel bracket assembly to the "no-drive" position.

It will be appreciated that the bearing plates 26 and 27, the jack shaft 70 and associated parts, the wheel mounting plates 91 and 92 and associated parts may be termed a driving attachment for the lawn mower of the type shown in the copending Lill application referred to above.

In view of the detailed description set out above, the operation of the lawn mower of the present invention will readily be understood by those skilled in the art and no further discussion thereof is included herewith. It will furthermore be apparent that there has been provided a drive control mechanism for drivingly connecting the prime mover to the wheels of the lawn mower to propel the same over the area to be mowed, and a very simple and foolproof mechanism for rendering this drive means effective or ineffective is provided.

While particular embodiments of the invention have been shown, it will be understood, of course, that the invention is not limited thereto, since many modifications may be made and it is, therefore, contemplated by the appended claims to cover any such modifications as fall within the true spirit and scope of the invention.

What is claimed as new and desired to be secured by Letters Patent of the United States is:

1. A lawn mower comprising a movable platform, a prime mover mounted upon said platform, cutting means supported by said platform in a position for performing a lawn mowing operation and drivingly connected to said prime mover, a pair of plates rigidly related to said platform one on either side thereof, a wheel bracket assembly including a pair of brackets one disposed adjacent each side plate, a pair of ground wheels having their axles supported one by each of said brackets, pivot means pivotally connecting each of said brackets to a corresponding one of said side plates for supporting said platform on said ground wheels, the pivotal axis of said pivot means being displaced relative to the axis of rotation of said ground wheels, a jack shaft journaled in said side plates and extending across said platform, said shaft having friction drive rollers connected thereto for frictionally driving said ground wheels in response to a predetermined movement of said brackets about said pivotal axis, spring means biasing said brackets about said pivot means in a direction to move said ground wheels into driving engagement with said friction drive rollers, and ground wheel drive disengaging means pivoted to said plates for camming said brackets in a direction opposite to that urged by said spring means.

2. A power lawn mower comprising a support, a prime mover and cutting means driven thereby mounted on said support, a pair of triangularly shaped wheel brackets having corresponding apices thereof pivoted to said support one on either side thereof, a pair of ground wheels each having its axle secured to a different one of said wheel brackets whereby said support is mounted on said ground wheels through said wheel brackets, a tie rod interconnecting said wheel brackets, tension spring means interconnecting said tie rod and said support, a jack shaft drivingly connected to said prime mover and extending across said support adjacent the peripheries of said ground wheels, said jack shaft being journaled in said support, friction drive rollers on each end of said jack shaft and capable of driving said ground wheels when said ground wheels are moved into frictional engagement with said friction drive rollers, roller means secured to each of said brackets, control means pivoted to said support including cam means selectively engageable with said roller means, and means actuating said control means to move the peripheries of said ground wheels out of driving engagement with said friction drive rollers.

3. A driving attachment for rotary mower bases having front and rear supporting wheels and a motor thereon for rotating a cutting blade including a pair of spaced bearing plates adapted for attachment at the sides of a mower base and a power transmitting shaft rotatably mounted in said plates, frictional driving elements carried by said shaft, one driving element being spaced outboard of each said bearing plate, means for mounting rear supporting wheels for a mower on said bearing plates, said mounting means including a pair of wheel mounting plates one spaced outboard of each said bearing plate, a tie rod interconnecting said mounting plates, said mounting plates being pivoted on said bearing plates rearwardly of said driving elements for movement of the wheels toward and away from said driving elements and for engagement with said elements, each of said mounting plates having an abutment projecting inwardly toward said bearing plates, and handle means pivoted to one pair of said pairs of plates and extending rearwardly therefrom, said handle means being adapted for engagement with said abutments upon downward movement thereof to cause movement of said mounting plates away from said driving elements.

4. A driving attachment for rotary mower bases having front and rear supporting wheels and a motor thereon for rotating a cutting blade including a pair of spaced bearing plates adapted for attachment at the sides of a mower base and a power transmitting shaft rotatably mounted in said plates, frictional driving elements carried by said shaft, one driving element being spaced outboard of each said bearing plate, means for mounting rear supporting wheels for a mower on said bearing plates, said mounting means including a pair of wheel mounting plates one spaced outboard of each said bearing plate, said mounting plates being pivoted on said bearing plates rearwardly of said driving elements for movement of the wheels toward and away from said driving elements and for engagement with said elements, each of said mounting plates having an abutment projecting inwardly toward said bearing plates, and handle means pivoted to said bearing plates and extending rearwardly therefrom, said handle means being adapted for engagement with said abutments upon downward movement thereof to cause movement of said mounting plates away from said driving elements.

5. The lawn mower of claim 1 wherein each side plate is provided with an elongated opening, and wherein each bracket is provided with roller means rotatably secured thereto, said roller means extending through the elongated opening in the associated side plates, said means pivoted to said plates including means engageable with said roller means.

6. The lawn mower of claim 1 wherein said last mentioned means includes a plate having a pair of spaced notches along one edge.

7. The lawn mower of claim 1 wherein said last mentioned means and said side plates are provided with cooperating interengaging portions whereby portions of said mower may be raised by mere actuation of the aforesaid last mentioned means.

8. A power lawn mower comprising a support, a prime mover and cutting means driven thereby mounted on said support, a pair of triangularly shaped wheel brackets having corresponding apices thereof pivoted to said support one on either side thereof, a pair of ground wheels each having its axle secured to a different one of said wheel brackets whereby said support is mounted on said ground wheels through said wheel brackets, a tie rod interconnecting said wheel brackets, tension spring means interconnecting said tie rod and said support, a jack shaft drivingly connected to said prime mover and extending across said support adjacent the peripheries of said ground wheels, said jack shaft being journaled in said support, friction drive rollers on each end of said jack shaft and capable of driving said ground wheels when said ground wheels are moved into frictional engagement with said friction drive rollers, roller means secured to each of said brackets, control means pivoted to said support including cam means selectively engageable with said roller means, means actuating said control means to move the peripheries of said ground wheels out of driving engagement with said friction drive rollers, and latching means secured to said support and engageable with said cam means.

References Cited in the file of this patent

UNITED STATES PATENTS

| | | |
|---|---|---|
| 2,604,747 | Bash | July 29, 1952 |
| 2,893,501 | Smith | July 7, 1959 |
| 2,896,731 | Siwek | July 28, 1959 |
| 2,903,081 | Rudman | Sept. 8, 1959 |
| 2,918,775 | Hollerith et al. | Dec. 29, 1959 |
| 2,962,854 | Jepson | Dec. 6, 1960 |